(12) United States Patent
Taguchi et al.

(10) Patent No.: US 9,903,738 B2
(45) Date of Patent: Feb. 27, 2018

(54) CONDUCTIVE MATERIAL, METHOD FOR PRODUCING THE CONDUCTIVE MATERIAL, AND TRANSDUCER INCLUDING THE CONDUCTIVE MATERIAL

(71) Applicants: SUMITOMO RIKO COMPANY LIMITED, Aichi-ken (JP); KYUSHU UNIVERSITY, NATIONAL UNIVERSITY CORPORATION, Fukuoka-ken (JP)

(72) Inventors: Yutaro Taguchi, Aichi-ken (JP); Hitoshi Yoshikawa, Aichi-ken (JP); Hidetsugu Torihara, Fukuoka-ken (JP); Ryosuke Matsuno, Saga-ken (JP); Masaharu Tsuji, Fukuoka-ken (JP); Atsushi Takahara, Fukuoka-ken (JP)

(73) Assignees: SUMITOMO RIKO COMPANY LIMITED, Aichi-Ken (JP); KYUSHU UNIVERSITY, NATIONAL UNIVERSITY CORPORATION, Fukuoka-Ken (JP)

(*) Notice: Subject to any disclaimer, the term of this patent is extended or adjusted under 35 U.S.C. 154(b) by 340 days.

(21) Appl. No.: 14/672,456

(22) Filed: Mar. 30, 2015

(65) Prior Publication Data
US 2015/0204697 A1    Jul. 23, 2015

Related U.S. Application Data

(63) Continuation of application No. PCT/JP2013/084236, filed on Dec. 20, 2013.

(30) Foreign Application Priority Data

Jan. 15, 2013    (JP) .................................. 2013-004682

(51) Int. Cl.
*G01D 5/24* (2006.01)
*B22F 1/00* (2006.01)
(Continued)

(52) U.S. Cl.
CPC .............. *G01D 5/24* (2013.01); *B22F 1/0025* (2013.01); *B22F 9/24* (2013.01); *C08F 220/18* (2013.01);
(Continued)

(58) Field of Classification Search
CPC ...... G01D 5/24; G01D 5/2405; C09D 133/08; C08F 220/18; C08F 226/10; B22F 1/0025;
(Continued)

(56) References Cited

U.S. PATENT DOCUMENTS

| 2009/0085072 A1 | 4/2009 | Lee et al. |
| 2011/0256383 A1 | 10/2011 | Cochet et al. |

(Continued)

FOREIGN PATENT DOCUMENTS

| JP | 2006-161102 | 6/2006 |
| JP | 2009-127092 | 6/2009 |

(Continued)

OTHER PUBLICATIONS

White et al., "Electrical Percolation Behavior in Silver Nanowire Polystyrene Composites: Simulation and Experiment", *Advanced Functional Materials*, vol. 20, pp. 2709-2716, 2010.
(Continued)

*Primary Examiner* — Billy Lactaoen
(74) *Attorney, Agent, or Firm* — Greenblum & Bernstein, P.L.C.

(57) ABSTRACT

A conductive material includes metal nanowires and an extensible copolymer having an N—C=O structure and combined with the metal nanowires. The conductive mate-
(Continued)

rial has excellent elongation properties and has an electrical resistance that is unlikely to increase even when the conductive material is extended. A method for producing a conductive material includes: a copolymer production step of polymerizing a plurality of monomers including a growth direction control monomer that has an N—C=O structure and controls a growth direction of metal nanowires to produce an extensible copolymer; a reaction step of reacting a metal compound in a solvent containing the copolymer to grow metal nanowires in a longitudinal direction; and an extraction step of extracting a product from the solution after the reaction.

11 Claims, 3 Drawing Sheets

(51) Int. Cl.
B22F 9/24 (2006.01)
C08F 226/10 (2006.01)
C08K 3/08 (2006.01)
H01B 1/22 (2006.01)
C08F 220/18 (2006.01)
C09D 133/08 (2006.01)
C08L 39/06 (2006.01)

(52) U.S. Cl.
CPC .............. C08F 226/10 (2013.01); C08K 3/08 (2013.01); C09D 133/08 (2013.01); G01D 5/2405 (2013.01); H01B 1/22 (2013.01); C08K 2201/001 (2013.01); C08K 2201/011 (2013.01); C08L 39/06 (2013.01)

(58) Field of Classification Search
CPC ....... B22F 9/24; C08K 3/08; C08K 2201/001; C08K 2201/011; H01B 1/22; C08L 39/06
USPC .......................................................... 324/686
See application file for complete search history.

(56) References Cited

U.S. PATENT DOCUMENTS

| 2012/0156088 A1* | 6/2012 | Andre | B22F 1/0018 420/466 |
| 2012/0241689 A1* | 9/2012 | Itou | H01B 1/22 252/511 |
| 2013/0087363 A1 | 4/2013 | Oh et al. | |
| 2013/0248488 A1* | 9/2013 | Han | G03F 7/0002 216/55 |
| 2015/0232628 A1* | 8/2015 | Han | C08J 7/12 427/539 |
| 2015/0321257 A1* | 11/2015 | Suh | B22F 1/0025 252/514 |
| 2015/0336173 A1* | 11/2015 | Kim | C30B 7/14 75/370 |

FOREIGN PATENT DOCUMENTS

| JP | 2011-216487 | | 10/2011 |
| JP | 2012-009383 | | 1/2012 |
| JP | 2012-138260 | | 7/2012 |
| JP | 2012-140701 | | 7/2012 |
| JP | 4999031 | * | 8/2012 |

OTHER PUBLICATIONS

International Search Report from PCT/JP2013/084236, dated Mar. 4, 2014, along with an English language translation.
English translation of the International Preliminary Report on Patentability for Application No. PCT/JP2013/084236, dated Mar. 4, 2014.

* cited by examiner

[FIG. 2]
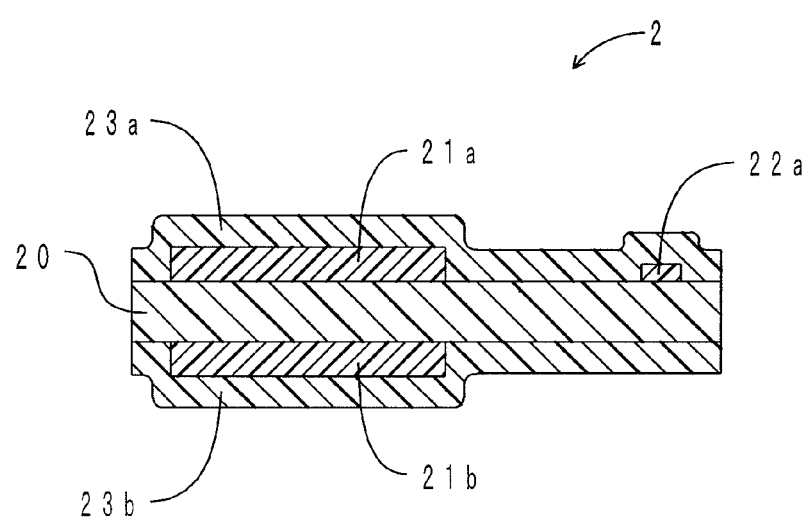

[FIG. 3]
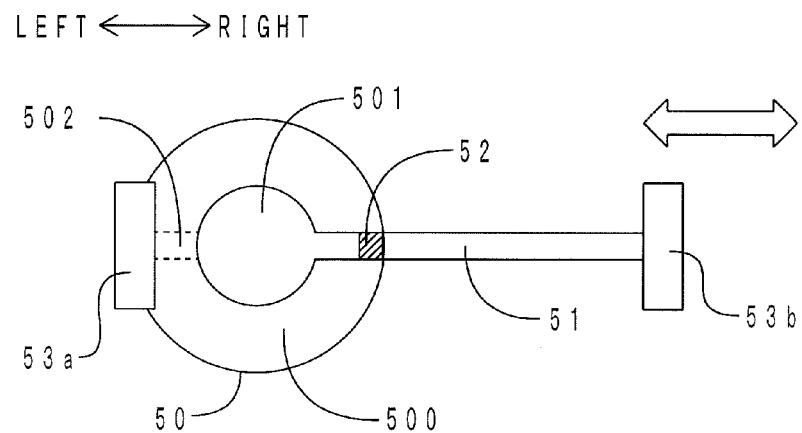
[FIG. 4]
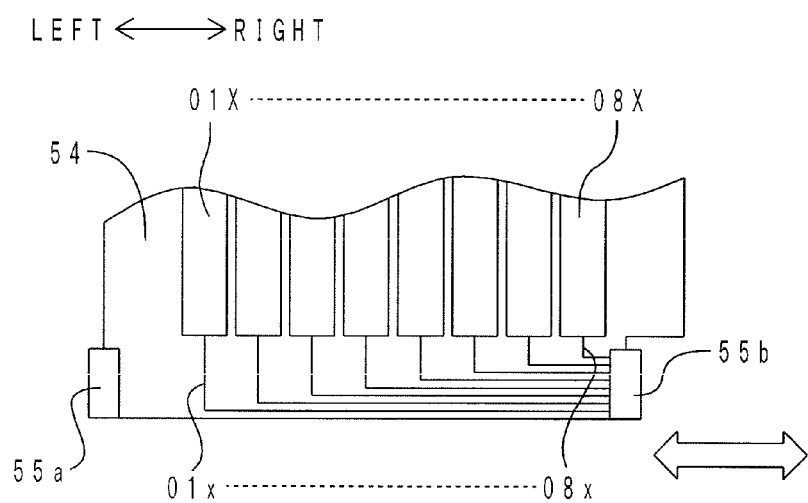

CONDUCTIVE MATERIAL, METHOD FOR PRODUCING THE CONDUCTIVE MATERIAL, AND TRANSDUCER INCLUDING THE CONDUCTIVE MATERIAL

CLAIM FOR PRIORITY

This application is a Continuation of PCT/JP2013/084236 filed Dec. 20, 2013, and claims the priority benefit of Japanese application 2013-004682 filed Jan. 15, 2013, the contents of which is expressly incorporated by reference herein in its entirety.

TECHNICAL FIELD

The present invention relates to a flexible conductive material including metal nanowires combined with a flexible copolymer, a method for producing the conductive material, and a transducer including the conductive material.

BACKGROUND ART

Highly flexible, compact and lightweight transducers have been developed by using polymer materials such as elastomers. Such a transducer includes a dielectric layer made of an elastomer between electrodes, for example. By changing an applied voltage between the electrodes, the dielectric layer extends or contracts. On this account, in a flexible transducer, electrodes and wirings are required to have elasticity so as to follow deformation of the dielectric layer. As an elastic conductive material, Patent Document 1 describes a conductive film including an elastomer and metal fibers, for example. In contrast, as disclosed in Patent Document 2, a transparent conductive film including silver nanowires is used as transparent electrodes for displays, touch panels, and so forth. The silver nanowires have high electric conductivity and thus are suitable as a conductive material.

RELATED ART DOCUMENTS

Patent Documents

Patent Document 1: Japanese Patent Application Publication No. 2012-138260 (JP 2012-138260 A)
Patent Document 2: Japanese Patent Application Publication No. 2009-127092 (JP 2009-127092 A)
Patent Document 3: Japanese Patent Application Publication No. 2006-161102 (JP 2006-161102 A)
Patent Document 4: Japanese Patent Application Publication No. 2012-140701 (JP 2012-140701 A)

Non-Patent Document

Non-Patent Document 1: Sadie I. White and eight others, "Electrical Percolation Behavior in Silver Nanowire-Polystyrene Composites: Simulation and Experiment", "Advanced Functional Materials", (Germany), 2010, Vol. 20, pp. 2709-2716

SUMMARY OF THE INVENTION

Problem to be Solved by the Invention

In flexible conductive materials capable of withstanding deformations such as bending and elongation, elastomers capable of elastic deformation are used as the base material. In an elastomer containing conventional silver nanowires, the silver nanowires unfortunately form aggregation. An elastomer with low polarity markedly causes the aggregation of silver nanowires.

To produce silver nanowires, a polyvinylpyrrolidone is typically used as a growth direction control agent for the silver nanowires (see Patent Documents 2 to 4). The polyvinylpyrrolidone adheres to the surface of silver particles and helps the silver particles to grow in one direction. To the surface of the produced silver nanowires, the polyvinylpyrrolidone adheres. Polyvinylpyrrolidone is water-soluble and thus has low compatibility with an elastomer. In an elastomer containing the silver nanowires with polyvinylpyrrolidone, the silver nanowires are entangled to cause aggregation. Such silver nanowires fail to form sufficient conductive pathways and cannot provide an intended electric conductivity. In addition, polyvinylpyrrolidone is a hard resin. On this account, an elastomer containing the silver nanowires to which polyvinylpyrrolidone adheres has mechanical properties such as tensile strength and elongation at break lower than those of the original elastomer.

In view of the above circumstances, it is an object of the present invention to provide a conductive material that contains metal nanowires, has excellent elongation properties, and has an electrical resistance that is less likely to increase even when the conductive material is extended. Another object of the present invention is to provide a method for producing the conductive material. Still another object of the present invention is to provide a transducer with excellent durability by using the conductive material.

Means for Solving the Problem (1) In order to solve the problem, a conductive material of the present invention is characterized by including: metal nanowires; and an extensible copolymer having an N—C=O structure and combined with the metal nanowires.

In the conductive material of the present invention, the extensible copolymer having an N—C=O structure is the base material. The conductive material of the present invention is thus flexible. The metal nanowires are combined with the copolymer. The metal nanowires are not in an aggregation form but are substantially extended and dispersed in the copolymer. Thus, the metal nanowires easily form conductive pathways through their contact with each other. On this account, even when containing the metal nanowires in a comparatively small amount, the conductive material has high electric conductivity. The number of contact points of the metal nanowires is large, and thus the metal nanowires are likely to remain in contact with each other even when the conductive material is extended. The conductive material of the present invention therefore has an electrical resistance that is less likely to increase even when the conductive material is extended.

Patent Document 4 discloses a method of producing silver nanowires having a large major axis length. The method uses a polymer prepared by polymerizing monomers including an N-substituted (meth)acrylamide, as a growth direction control agent for the silver nanowires. In the production method described in Patent Document 4, silver nanowires are produced by a reaction in a solution, then isolated from the reaction solution, and purified. Thus, the purified silver nanowires are not combined with a polymer. The polymer is used merely as the growth direction control agent for the silver nanowires. Thus, the extensibility of the polymer is not discussed.

(2) A method for producing the conductive material of the present invention is characterized by including: a copolymer production step of polymerizing a plurality of monomers including a growth direction control monomer that has an N—C=O structure and controls a growth direction of metal nanowires to produce an extensible copolymer; a reaction step of reacting a metal compound in a solvent containing the copolymer to grow metal nanowires in a longitudinal direction; and an extraction step of extracting a product from a solution after the reaction.

As described above, a typical growth direction control agent for silver nanowires is a polyvinylpyrrolidone, which is a hard resin. For example, a polyvinylpyrrolidone and a silver compound are reacted in a polyol to produce silver nanowires. In contrast, the method for producing the conductive material of the present invention does not use polyvinylpyrrolidone alone. In other words, in the method for producing the conductive material of the present invention, an extensible copolymer is previously produced, and a metal compound is reacted in a solvent containing the copolymer produced. The copolymer is produced by polymerizing a plurality of monomers. Among the plurality of monomers, at least one monomer is a growth direction control monomer that has an N—C=O structure and controls the growth direction of metal nanowires. In the reaction step, a growth direction control component in the copolymer adheres to metal nanowires, and the copolymer itself forms an assembly to function as a protective colloid. This mechanism is supposed to accelerate the growth of the metal nanowires in the longitudinal direction. In this way, the copolymer serves as a base material combined with the metal nanowires and controls the growth direction of the metal nanowires during the reaction. The production method of the present invention therefore allows the production of metal nanowires and the production of a flexible conductive material in which the metal nanowires are combined with the copolymer.

(3) A transducer of the present invention is characterized by including: a dielectric layer made of an elastomer; a plurality of electrodes with the dielectric layer interposed therebetween; and wirings connected to the corresponding electrodes, in which either one or both of the electrodes and the wirings include the conductive material of the present invention.

Examples of the transducer include actuators, sensors, power generation devices and the like that perform the conversion between mechanical energy and electric energy, and speakers, microphones, and the like that perform the conversion between acoustic energy and electric energy. In the transducer of the present invention, either one or both of the electrodes and the wirings include the conductive material of the present invention. Therefore, when the dielectric layer is deformed, the electrodes and/or the wirings follow the deformation to extend or shrink. Thus, with the transducer of the present invention, the movement of the dielectric layer is less likely to be restricted by the electrodes and/or wirings. The electrodes and the wirings including the conductive material of the present invention have high electric conductivity and have an electrical resistance that is less likely to increase even when the electrodes and the wirings are extended. Thus, deterioration in performance of the transducer of the present invention due to the electrodes or the wirings is less likely to occur. The transducer of the present invention therefore has excellent durability.

BRIEF DESCRIPTION OF THE DRAWINGS

FIG. 2 is a sectional view taken along line II-II in FIG. 1.

FIG. 3 is a top view showing an outline of a first durability test.

FIG. 4 is a top view showing an outline of a second durability test.

DESCRIPTION OF THE REFERENCE NUMERALS

Figure 1:
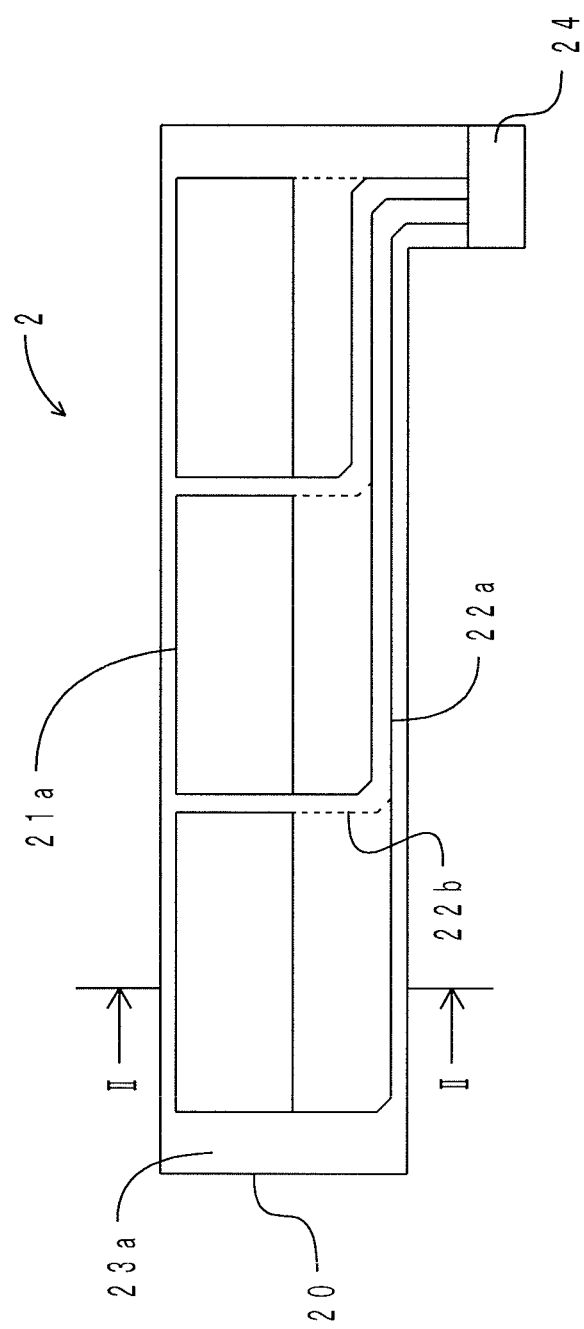
FIG. 1 is a top view of a capacitance sensor as an embodiment of a transducer of the present invention.

2: capacitance sensor (transducer); 20: dielectric layer; 21a, 21b: electrode; 22a, 22b: wiring; 23a, 23b: cover film; 24: connector 50: device; 500: substrate; 501, 502: electrode; 51: lead wire; 52: electrically conductive adhesive; 53a, 53b: holder; 54: substrate; 55a, 55b: holder; 01X to 08X: electrode; 01x to 08x: wiring

MODES FOR CARRYING OUT THE INVENTION

Embodiments of a conductive material, a method for producing the conductive material, and a transducer of the present invention will be described hereinafter. The conductive material, the method for producing the conductive material, and the transducer of the present invention are not limited to the embodiments below, and various modifications, improvements, and the like may be made thereto by a person skilled in the art without departing from the scope of the present invention.

<Conductive Material>

The conductive material of the present invention includes metal nanowires and an extensible copolymer having an N—C=O structure and combined with the metal nanowires.

The material of the metal nanowires is not specifically limited. Examples of the metal include silver, gold, copper, platinum, and nickel. The nanowire may be composed of a single metal or two or more metals. Specifically, the silver nanowire containing silver is preferred because it has high electric conductivity and is relatively inexpensive. The conductive material may contain a single type of metal nanowire or two or more types of metal nanowires.

The size of the metal nanowires is not specifically limited. However, as the length of the metal nanowires in the transverse direction (diameter) increases, that is, as the metal nanowires becomes thicker, the number of the metal nanowires per unit volume becomes smaller. Accordingly, the number of contact points of the metal nanowires decreases, and thus, the conductive material is more likely to have a larger electrical resistance when extended. Thus, the metal nanowires preferably have an average length in the transverse direction of 500 nm or less and more preferably 200 nm or less. As the length of the metal nanowires in the longitudinal direction decreases, that is, as the metal nanowires becomes shorter, the metal nanowires become less likely to contact each other. Accordingly, conductive pathways are difficult to be formed. A conductive material having a smaller number of the contact points is likely to have a larger electrical resistance when extended. Thus, the metal nanowires preferably have an average length in the longitudinal direction of 3 μm or more. The size of the metal nanowire are determined by observing a cross section of a conductive material under a scanning electron microscope (SEM), a transmission electron microscope (TEM), or the like and calculating the arithmetic mean from a predetermined number of nanowires.

The conductive material of the present invention may contain a smaller amount of metal component than that of a conventional conductive material containing a metal powder. For example, the amount of the metal component may be 250 parts by mass or less relative to 100 parts by mass of the polymer in the conductive material. When containing a metal component in an amount of 150 parts by mass or less, and further, 100 parts by mass or less, the conductive material has higher flexibility. The amount of the metal component can be determined by simultaneous thermogravimetry/differential thermal analysis of the conductive material.

The copolymer combined with the metal nanowires is extensible and has an N—C=O structure. The copolymer can be produced by copolymerizing a growth direction control monomer that has an structure and controls the growth direction of metal nanowires and one or more monomers other than the growth direction control monomer.

The polymeric form may be any of a random copolymer, an alternating copolymer, a block copolymer, a graft copolymer, and the like. Examples of the polymerization method include solution polymerization, suspension polymerization, emulsion polymerization, precipitation polymerization, chain polymerization, sequential polymerization, living polymerization, addition polymerization, polycondensation (condensation polymerization), addition condensation, radical polymerization, cationic polymerization, anionic polymerization, coordination polymerization, and ring-opening polymerization. For example, the copolymer is preferably produced by radical polymerization of the growth direction control monomer and an additional monomer. A single monomer or two or more monomers may be used as each of the growth direction control monomer and the additional monomer.

The growth direction control monomer may be a known monomer having an N—C=O structure, including pyrrolidone monomers such as N-vinyl-2-pyrrolidone and 1-(2-propenyl)-2-pyrrolidone; acrylamide monomers such as acrylamide, N,N-dimethylacrylamide, and N-(2-hydroxyethyl)acrylamide; isocyanate monomers such as methylene diphenyl diisocyanate, toluene diisocyanate, xylene diisocyanate, naphthalene diisocyanate, hexamethylene diisocyanate, and isophorone diisocyanate; and 4-acryloylmorpholine. Among them, N-vinyl-2-pyrrolidone is preferred because it is soluble in water and most organic solvents such as ethylene glycol and propylene glycol.

In view of imparting flexibility to the copolymer, the additional monomer is preferably a raw material monomer of an elastomer. When the copolymer contains an elastomer, the conductive material obtains higher extensibility and durability. Preferred examples of the elastomer include acrylic rubber, urethane rubber, natural rubber, isoprene rubber, butadiene rubber, ethylene-propylene rubber, acrylonitrile-butadiene rubber, chloroprene rubber, hydrin rubber, butyl rubber, chlorosulfonated polyethylene rubber, fluororubber, and known thermoplastic elastomers. Among them, acrylic rubber has low crystallizability and weak intermolecular force. On this account, with a raw material monomer of the acrylic rubber, a more flexible copolymer can be formed.

By using a monomer having a known crosslinkable group typically used for crosslinking of rubber, such as a hydroxy group, a carboxy group, an amino group, a mercapto group, an alkenyl group, a vinyl group, an acid anhydride group, and an epoxy group, a crosslinked structure can be formed in the copolymer. A conductive material including the copolymer having a crosslinked structure obtains higher durability when the conductive material extends and contracts repeatedly.

The conductive material of the present invention may contain other elastomer components in addition to the metal nanowires and the extensible copolymer combined with the metal nanowires. In this case, the copolymer and the additional elastomer component may be simply blended, may be crosslinked to each other, or may be crosslinked independently. In particular, a conductive material containing the elastomer component crosslinked with the copolymer obtains higher extensibility and obtains higher durability when the conductive material extends and contracts repeatedly.

To achieve a flexible conductive material, the copolymer preferably has a glass transition temperature (Tg) of 25° C. or less. A copolymer may have a Tg of 25° C. or more when the copolymer contains an additional elastomer component and is compatible with the additional elastomer component. In such a case, a blend or a crosslinked product (hereinafter, a blend and a crosslinked product are collectively called a copolymer or the like) of the copolymer and the additional elastomer component has a Tg of 25° C. or less. In contrast, when the copolymer is incompatible with an additional elastomer component, the additional elastomer component preferably also has a Tg of 25° C. or less. When having a lower Tg, the copolymer or the like has lower crystallizability and thus has larger elongation at break. In other words, the copolymer or the like becomes more extensible. The copolymer or the like more preferably has a Tg of 15° C. or less, 0° C. or less, −20° C. or less, and even more preferably −35° C. or less. In the present specification, the glass transition temperature is an intermediate glass transition temperature determined in accordance with JIS K7121 (1987).

<Method for Producing Conductive Material>

A method for producing the conductive material of the present invention includes a copolymer production step, a reaction step, and an extraction step. Each step will be described hereinafter.

(1) Copolymer Production Step

In the step, a plurality of monomers including a growth direction control monomer that has an N—C=O structure and controls a growth direction of metal nanowires are polymerized to produce an extensible copolymer.

The type of the monomer is as described in the embodiment of the conductive material. The molar ratio of the growth direction control monomer and the additional monomer preferably ranges from 99.99:0.01 to 5:95. The range is more preferably 90:10 to 20:80.

First, in a reaction vessel, monomers to be copolymerized are placed. Next, a polymerization initiator is added, and the whole is reacted at a reaction temperature of 60 to 110° C. for about 4 to 12 hours. The polymerization initiator may be a known initiator such as azo compounds, organic peroxides, and dihalogens. For example, 2,2'-azobis(2-methylpropionitrile) (AIBN) or 1,1'-azobis(cyclohexanecarbonitrile) can be used. When a solvent is used, the solvent may be methanol or ethanol, for example. The copolymer may have a weight average molecular weight of about 20,000 to 100,000.

(2) Reaction Step

In the step, a metal compound is reacted in a solvent containing the copolymer produced to grow metal nanowires in a longitudinal direction.

The copolymer and the metal compound are preferably reacted in the presence of a wire generator or other agents. Each raw material of the copolymer, the metal compound, and the wire generator may be a solution in which the raw material is previously dissolved or may be added to a reaction vessel containing a solvent to be used. To uniformly mix the raw materials, a solution in which the raw material is previously dissolved is preferably used. In other words, a copolymer solution in which the copolymer is dissolved in a solvent, a metal compound solution in which the metal compound is dissolved in a solvent, and a wire generator solution in which the wire generator is dissolved in a solvent are preferably mixed and reacted. Here, the raw materials may be placed in any order. To facilitate selective generation of metal nanowires, it is preferred that the copolymer and the wire generator be placed in a reaction vessel and stirred, and then the metal compound be mixed. The copolymer, the wire generator, and the metal compound are mixed preferably at a molar ratio of 100 to 900:1:10 to 600.

The metal compound may be appropriately selected depending on the type of metal nanowires. The type of the metal is as described in the embodiment of the conductive material. Examples of the metal compound include salts capable of generating metal ions, including inorganic acid salts such as nitrates, chlorides, sulfates, carbonates, chlorates, and perchlorates and organic acid salts such as acetates and lactates. Among them, nitrates are preferred.

The wire generator is an inorganic chloride or an organic chloride capable of generating chloride ions. Examples of the wire generator include alkali metal chlorides such as sodium chloride and potassium chloride; alkaline earth metal chlorides such as magnesium chloride and calcium chloride; earth metal chlorides such as aluminum chloride; zinc group metal chlorides such as zinc chloride; carbon group metal chlorides such as tin chloride; transition metal chlorides such as manganese chloride, iron chloride, cobalt chloride, nickel chloride, and zirconium oxychloride; amine hydrochlorides such as ammonium chloride, hydrazine hydrochloride, methylamine hydrochloride, dimethylamine hydrochloride, triethylamine hydrochloride, ethylamine hydrochloride, diethylamine hydrochloride, triethylamine hydrochloride, propylamine hydrochloride, dipropylamine hydrochloride, tripropylamine hydrochloride, butylamine hydrochloride, dibutylamine hydrochloride, tributylamine hydrochloride, pentylamine hydrochloride, hexylamine hydrochloride, ethanolamine hydrochloride, diethanolamine hydrochloride, triethanolamine hydrochloride, dimethylethanolamine hydrochloride, methyldiethanolamine hydrochloride, cyclohexylamine hydrochloride, ethylenediamine hydrochloride, diethylenetetramine hydrochloride, triethylenepentamine hydrochloride, aniline hydrochloride, toluidine hydrochloride, glucosamine hydrochloride, and acetamidine hydrochloride; amino acid hydrochlorides such as alanine hydrochloride, arginine hydrochloride, lysine hydrochloride, cysteine hydrochloride, glutamic acid hydrochloride, ornithine hydrochloride, and cystine dihydrochloride; and phosphonium chlorides such as tetrabutylphosphonium chloride, methoxymethyltriphenylphosphonium chloride, and benzyltriphenylphosphonium chloride. Among them, sodium chloride is preferred because metal nanoparticles are readily formed as a core and a residual salt is readily removed, for example.

The solvent is not particularly limited as long as the solvent can reduce metal ions. Examples of the solvent include polyols including diols such as ethylene glycol, propylene glycol (including isomers), butanediol (including isomers), pentanediol (including isomers), hexanediol (including isomers), diethylene glycol, dipropylene glycol (including isomers), triethylene glycol (including isomers), and tripropylene glycol (including isomers); triols such as glycerin, butanetriol (including isomers), pentanetriol (including isomers), and hexanetriol (including isomers); tetraols such as butane tetraol (including isomers), pentane tetraol (including isomers), and hexane tetraol (including isomers); pentaols such as pentane pentaol (including isomers) and hexane pentaol (including isomers); and hexaols such as hexane hexaol (including isomers). The solvent may be an alcohol or an ether, for example. Among them, ethylene glycol is preferred because it is liquid at normal temperature and readily dissolves raw materials.

The reaction can be carried out under appropriately selected conditions such as heating, pressurization, and microwave irradiation. For example, when a mixed solution of the raw materials is heated, the reaction temperature is preferably about 30 to 290° C. As the reaction progresses, the mixed solution becomes cloudy. This change can indicate the formation of the metal nanowires. After the observation of the cloudiness, the reaction is preferably continued for about 30 minutes. After the completion of the reaction, the mixed solution is subjected to the next step. When the reaction has been carried out with heating, the mixed solution is cooled before the next step.

(3) Extraction Step

In the step, the product is extracted from the solution after the reaction. The product is a composite of the metal nanowires and the copolymer and is included in the conductive material of the present invention. The product may be extracted by filtration, centrifugation, reprecipitation, or the like. The extracted product may be dissolved in a solvent to prepare a conductive paint. The conductive paint may contain additional elastomer polymers, as necessary. The additional elastomer polymer may be added in the reaction step (2). The prepared conductive paint is formed into a film to produce a thin film-like conductive material. The conductive paint is preferably subjected to mixing such as stirring or treatment with various dispersers (for example, sonication) in order to improve the dispersibility of the product in a solvent or additional elastomer polymers.

When produced by using a monomer having a crosslinkable group, the copolymer in the product can be crosslinked by adding a crosslinking agent to the extracted product. In this case, the process is as follows, for example. First, to a conductive paint containing the extracted product, a crosslinking agent is added. Subsequently, the mixture is subjected to sonication, as necessary. Next, the conductive paint is applied to a substrate, and the coating is heated to undergo crosslinking reaction. In this way, the method for producing the conductive material of the present invention may further include a crosslinking step of adding a crosslinking agent to the product and crosslinking the copolymer in the product, after the extraction step.

In the crosslinking step, an elastomer polymer crosslinkable with the copolymer may be added in addition to the crosslinking agent. The elastomer polymer is crosslinked with the copolymer. This allows the copolymer to have a crosslinked structure regardless of the presence or absence of a crosslinkable group in raw material monomers of the copolymer. The constituents of the elastomer polymer to be added may be the same as or different from those of the copolymer.

<Transducer>

A transducer of the present invention includes a dielectric layer made of an elastomer, a plurality of electrodes with the dielectric layer interposed therebetween, and wirings connecting to the corresponding electrodes. In the transducer of the present invention, the number of the dielectric layers may be one or two or more. Here, the term "made of an elastomer" means that the base material of the dielectric layer is an elastomer. Thus, the dielectric layer may contain other components in addition to the elastomer component.

Examples of the dielectric layer include an elastomer layer exclusively containing an elastomer, a high-resistivity layer containing an elastomer and insulating inorganic particles, an ionic component-containing layer containing an elastomer and ionic components, and a semiconductor-containing layer containing an elastomer and a semiconductor. The transducer of the present invention may have a multilayer structure in which dielectric layers and electrodes are alternately stacked.

In order to increase the displacement and the generative force of the transducer, the elastomer preferably has a relative dielectric constant (100 Hz) at normal temperature of 2 or more and more preferably 5 or more. Preferred examples of the elastomer include silicone rubber, nitrile rubber (NBR), hydrogenated nitrile rubber (H-NBR), an ethylene-propylene-diene copolymer (EPDM), acrylic rubber, urethane rubber, epichlorohydrin rubber, chlorosulfonated polyethylene, and chlorinated polyethylene.

In the transducer of the present invention, either one or both of the electrodes and the wirings include the conductive material of the present invention. The structure and the production method of the conductive material of the present invention are as described above, and thus are not described here. For the electrodes and the wirings of the transducer of the present invention, the preferred embodiment of the conductive material of the present invention is preferably employed. A capacitance sensor will next be described as an example of the transducer of the present invention.

First, the configuration of a capacitance sensor in the embodiment will be described. FIG. 1 is a top view of the capacitance sensor. FIG. 2 is a sectional view taken along line II-II in FIG. 1. As shown in FIG. 1 and FIG. 2, a capacitance sensor 2 includes a dielectric layer 20, a pair of electrodes 21a, 21b, wirings 22a, 22b, and cover films 23a, 23b.

The dielectric layer 20 is made of H-NBR and has a strip shape extending in the left-right direction. The dielectric layer 20 has a thickness of about 300 μm.

The electrode 21a has a rectangular shape. Three electrodes 21a are formed on the top face of the dielectric layer 20 by screen printing. Similarly, the electrode 21b has a rectangular shape. Three electrodes 21b are formed on the bottom face of the dielectric layer 20 so as to face the electrodes 21a with the dielectric layer 20 interposed therebetween. The electrodes 21b are formed on the bottom face of the dielectric layer 20 by screen printing. In this manner, three pairs of the electrodes 21a, 21b are disposed with the dielectric layer 20 interposed therebetween. The electrodes 21a, 21b are made of the conductive material of the present invention.

The wirings 22a are connected to the corresponding electrodes 21a formed on the top face of the dielectric layer 20. The wiring 22a connects the electrode 21a to a connector 24. The wirings 22a are formed on the top face of the dielectric layer 20 by screen printing. Similarly, the wirings 22b are connected to the corresponding electrodes 21b formed on the bottom face of the dielectric layer 20 (in FIG. 1, shown by dotted lines). The wirings 22b connect the electrodes 21b to a connector (not shown). The wirings 22b are formed on the bottom face of the dielectric layer 20 by screen printing. The wirings 22a, 22b are made of the conductive material of the present invention.

The cover film 23a is made of acrylic rubber and has a strip shape extending in the left-right direction. The cover film 23a covers the top faces of the dielectric layer 20, the electrodes 21a, and the wirings 22a. Similarly, the cover film 23b is made of acrylic rubber and has a strip shape extending in the left-right direction. The cover film 23b covers the bottom faces of the dielectric layer 20, the electrodes 21b, and the wirings 22b.

Next, the movement of the capacitance sensor 2 will be described. For example, when the capacitance sensor 2 is pushed from above, the dielectric layer 20, the electrodes 21a, and the cover film 23a are monolithically bent downward. The compression reduces the thickness of the dielectric layer 20. Consequently, the capacitance between the electrodes 21a, 21b becomes large. A deformation by the compression can be detected on the basis of a change in the capacitance.

Next, advantageous effects of the capacitance sensor 2 will be described. According to the present embodiment, the electrodes 21a, 21b and the wirings 22a, 22b are flexible. On this account, the movement of the dielectric layer 20 is less likely to be restricted by the electrodes 21a, 21b and the wirings 22a, 22b. Thus, the capacitance sensor 2 has good responsivity. Also, the electrodes 21a, 21b and the wirings 22a, 22b have high electric conductivity. In addition, the electrical resistance of the electrodes 21a, 21b and the wirings 22a, 22b is less likely to increase even when the electrodes 21a, 21b and the wirings 22a, 22b are extended. Thus, deterioration in performance of the capacitance sensor 2 due to the electrodes 21a, 21b and the wirings 22a, 22b is less likely to occur. The capacitance sensor 2 thus has excellent durability.

EXAMPLES

Next, the present invention will be described in further detail with reference to Examples.

<Production of Copolymer>

[Copolymer A]

Two types of monomers were radically polymerized to produce a copolymer A. The monomers used were n-butyl acrylate (BA) as a raw material monomer of an acrylic rubber and N-vinyl-2-pyrrolidone (VP) as a growth direction control monomer. As for the ratio of the monomers, BA was 50% by mole and VP was 50% by mole.

In a reaction vessel, BA and VP as the monomers and ethanol as the solvent were placed, and AIBN as the polymerization initiator was further added. The whole was reacted at a reaction temperature of 75° C. for 6 hours. The obtained copolymer A had a weight average molecular weight of 86,000, which was determined by gel permeation chromatography (GPC). The copolymer A had a Tg of 18° C.

[Copolymer B]

Three types of monomers were radically polymerized to produce a copolymer B. The monomers used were n-butyl acrylate (BA) and 2-hydroxyethyl acrylate (HEA) as raw material monomers of acrylic rubber and N-vinyl-2-pyrrolidone (VP) as a growth direction control monomer. HEA has a hydroxy group (—OH) as a crosslinkable group. As for the ratio of the monomers, BA was 49% by mole, HEA was 2% by mole, and VP was 49% by mole.

In a reaction vessel, BA, HEA, and VP as the monomers and ethanol as the solvent were placed, and AIBN as the polymerization initiator was further added. The whole was reacted at a reaction temperature of 75° C. for 6 hours. The obtained copolymer B had a weight average molecular weight of 86,000. The copolymer B had a Tg of 14° C.

[Copolymer C]

A copolymer C was produced in the same manner as the copolymer A except that the ratio of BA was changed to 75% by mole and the ratio of VP was changed to 25% by mole.

The obtained copolymer C had a weight average molecular weight of 74,000 and a Tg of −14° C.

[Copolymer D]

A copolymer D was produced in the same manner as the copolymer A except that the ratio of BA was changed to 25% by mole and the ratio of VP was changed to 75% by mole. The obtained copolymer D had a weight average molecular weight of 132,000 and a Tg of 39° C.

<Production of Conductive Material>

Example 1

First, a copolymer A solution (copolymer A concentration: 303 mM) in which the copolymer A was dissolved in ethylene glycol, a NaCl solution (NaCl concentration: 10 mM) in which sodium chloride as the wire generator was dissolved in ethylene glycol, and a AgNO$_3$ solution (AgNO$_3$ concentration: 465 mM) in which silver nitrate was dissolved in ethylene glycol were prepared. Next, the NaCl solution was added to the copolymer A solution, and the whole was stirred. The AgNO$_3$ solution was further added, and the whole was stirred to prepare a mixed solution. The ratio of the raw materials was copolymer A:NaCl:AgNO$_3$=880:1:155 in terms of molar ratio. The mixed solution was heated to 195° C. to initiate the reaction. After a while, the mixed solution became cloudy. After the observation of the cloudiness, the reaction mixture was heated for another 30 minutes. The heating was then stopped, and the mixed solution was cooled with water.

Next, the mixed solution was filtered under reduced pressure to extract a solid product (a composite of silver nanowires and the copolymer A). The product was dissolved in N,N-dimethylformamide as the solvent to prepare a conductive paint. The prepared conductive paint was sonicated for 15 minutes. The conductive paint was applied to the surface of a substrate by bar coating, and dried at 150° C. for 1 hour. The obtained conductive film is called the conductive film of Example 1. The conductive film of Example 1 is included in the conductive material of the present invention.

A cross section of the conductive film of Example 1 was observed under TEM, which showed that substantially extended silver nanowires were dispersed in the copolymer A. The silver nanowires had an average length in the longitudinal direction of 3,600 nm and an average length in the transverse direction of 190 nm. In order to determine the silver content in the conductive film of Example 1, the conductive film was subjected to simultaneous thermogravimetry/differential thermal analysis. For the analysis, a simultaneous thermogravimetry/differential thermal analyzer ("TG/DTA 6300" manufactured by Seiko Instruments Inc.) was used. The analysis was carried out as follows: 5.5 mg of a sample was placed on an alumina crucible and analyzed in an analysis range of 30 to 1,000° C. at a temperature increase rate of 20° C./min in the atmosphere. The silver content was calculated from the analysis result to be 66 parts by mass relative to 100 parts by mass of the copolymer A.

Example 2

First, a copolymer B solution (copolymer B concentration: 303 mM) in which the copolymer B was dissolved in ethylene glycol was prepared. Next, to the copolymer B solution, the same NaCl solution as in Example 1 was added, and the whole was stirred. The same AgNO$_3$ solution as in Example 1 was further added, and the whole was stirred to prepare a mixed solution. The ratio of the raw materials was copolymer B:NaCl:AgNO$_3$=880:1:155 in terms of molar ratio. The mixed solution was heated to 195° C. to initiate the reaction. After a while, the mixed solution became cloudy. After the observation of the cloudiness, the reaction mixture was heated for another 30 minutes. The heating was then stopped, and the mixed solution was cooled with water.

Next, the mixed solution was filtered under reduced pressure to extract a solid product (a composite of silver nanowires and the copolymer B). The product was dissolved in N,N-dimethylformamide as the solvent, and then diphenylmethane diisocyanate as the crosslinking agent was added to prepare a conductive paint. The prepared conductive paint was sonicated for 15 minutes. The conductive paint was applied to the surface of a substrate by bar coating, and dried and crosslinked at 150° C. for 1 hour. The obtained conductive film is called the conductive film of Example 2. The conductive film of Example 2 is included in the conductive material of the present invention.

A cross section of the conductive film of Example 2 was observed under TEM, which showed that substantially extended silver nanowires were dispersed in the copolymer B. The silver nanowires had an average length in the longitudinal direction of 3,700 nm and an average length in the transverse direction of 180 nm. The silver content in the conductive film of Example 2 was determined in the same manner as in Example 1 to be 62 parts by mass relative to 100 parts by mass of the copolymer B.

Example 3

In the same manner as in Example 1, a mixed solution of the copolymer A solution, the NaCl solution, and the AgNO$_3$ solution were reacted, giving a product (a composite of silver nanowires and the copolymer A). The product and an acrylic rubber polymer ("Nipol (registered trademark) AR51" manufactured by ZEON CORPORATION, Tg: −14° C.) were dissolved in N,N-dimethylformamide as the solvent, and ethylenediamine as the crosslinking agent was further added to prepare a conductive paint. The prepared conductive paint was sonicated for 15 minutes. The conductive paint was applied to the surface of a substrate by bar coating, and dried and crosslinked at 150° C. for 1 hour. The obtained conductive film is called the conductive film of Example 3. The conductive film of Example 3 is included in the conductive material of the present invention.

A cross section of the conductive film of Example 3 was observed under TEM, which showed that substantially extended silver nanowires were dispersed in the copolymer A and the acrylic rubber. The silver content in the conductive film of Example 3 was determined in the same manner as in Example 1 to be 65 parts by mass relative to 100 parts by mass of the copolymer A and the acrylic rubber. The crosslinked product of the copolymer A and the acrylic rubber had a Tg of 2° C.

Example 4

In the same manner as in Example 1, a mixed solution of the copolymer A solution, the NaCl solution, and the AgNO$_3$ solution were reacted, giving a product (a composite of silver nanowires and the copolymer A). The product and a polyurethane resin polymer A ("NIPPOLAN (registered trademark) 2304" manufactured by Nippon Polyurethane Industry Co., Ltd., Tg: −23° C.) were dissolved in N,N-dimethylformamide as the solvent to prepare a conductive paint. The prepared conductive paint was sonicated for 15 minutes. The conductive paint was applied to the surface of a substrate by bar coating, and dried at 150° C. for 1 hour. The obtained conductive film is called the conductive film of Example 4. The conductive film of Example 4 is included in the conductive material of the present invention.

A cross section of the conductive film of Example 4 was observed under TEM, which showed that substantially extended silver nanowires were dispersed in the copolymer C and the polyurethane resin A. The silver nanowires had an average length in the longitudinal direction of 7,200 nm and an average length in the transverse direction of 350 nm. The silver content in the conductive film of Example 4 was determined in the same manner as in Example 1 to be 67 parts by mass relative to 100 parts by mass of the copolymer C and the polyurethane resin A. The blend of the copolymer C and the polyurethane resin A had a Tg of −3° C.

Example 5

First, a copolymer C solution (copolymer C concentration: 303 mM) in which the copolymer C was dissolved in ethylene glycol was prepared. Next, to the copolymer C solution, the same NaCl solution as in Example 1 was added, and the whole was stirred. The same $AgNO_3$ solution as in Example 1 was further added, and the whole was stirred to prepare a mixed solution. The ratio of the raw materials was copolymer C:NaCl:$AgNO_3$=880:1:155 in terms of molar ratio. The mixed solution was heated to 195° C. to initiate the reaction. After a while, the mixed solution became cloudy. After the observation of the cloudiness, the reaction mixture was heated for another 30 minutes. The heating was then stopped, and the mixed solution was cooled with water.

Next, the mixed solution was filtered under reduced pressure to extract a solid product (a composite of silver nanowires and the copolymer C). The product and an additional copolymer D were dissolved in N,N-dimethylformamide as the solvent to prepare a conductive paint. The prepared conductive paint was sonicated for 15 minutes. The conductive paint was applied to the surface of a substrate by bar coating, and dried and crosslinked at 150° C. for 1 hour. The obtained conductive film is called the conductive film of Example 5. The conductive film of Example 5 is included in the conductive material of the present invention.

A cross section of the conductive film of Example 5 was observed under TEM, which showed that substantially extended silver nanowires were dispersed in the copolymer C and the copolymer D. The silver nanowires had an average length in the longitudinal direction of 4,100 nm and an average length in the transverse direction of 200 nm. The silver content in the conductive film of Example 5 was determined in the same manner as in Example 1 to be 70 parts by mass relative to 100 parts by mass of the copolymer C and the copolymer D.

Comparative Example 1

First, 100 parts by mass of the polyurethane resin polymer A (the same as the above) was dissolved in N,N-dimethylformamide as the solvent. To the urethane polymer solution, 300 parts by mass of silver powder B ("AgC-224", flaky, manufactured by Fukuda Metal Foil & Powder Co.) was added, and the whole was stirred to prepare a conductive paint. The prepared conductive paint was applied to the surface of a substrate by bar coating, and dried at 150° C. for 1 hour to produce a conductive film. The obtained conductive film is called the conductive film of Comparative Example 1.

Comparative Example 2

First, 100 parts by mass of an acrylic rubber polymer ("Nipol AR42W" manufactured by ZEON CORPORATION, Tg: −26° C.) and 0.1 part by mass of ethylenediamine as the crosslinking agent were mixed with a roll mill to prepare an acrylic rubber composition. The prepared acrylic rubber composition was dissolved in butyl carbitol acetate to prepare an acrylic rubber solution. To the acrylic rubber solution, 300 parts by mass of the silver powder B (the same as the above) was added, and the whole was stirred to prepare a conductive paint. The prepared conductive paint was applied to the surface of a substrate by bar coating, and dried at 150° C. for 1 hour to produce a conductive film. The obtained conductive film is called the conductive film of Comparative Example 2.

Comparative Example 3

First, 100 parts by mass of polyurethane resin polymer B ("Dispercoll (registered trademark) U42" manufactured by Bayer MaterialScience Ltd., Tg: −2° C.) was dissolved in butyl carbitol acetate as the solvent. To the urethane polymer solution, 1,340 parts by mass of silver powder A ("AgC-239", flat, manufactured by Fukuda Metal Foil & Powder Co.) was added, and the whole was stirred to prepare a conductive paint. The prepared conductive paint was applied to the surface of a substrate by bar coating, and dried at 150° C. for 1 hour to produce a conductive film. The obtained conductive film is called the conductive film of Comparative Example 3.

<Evaluation>

(1) The flexibility and the conduction characteristics of each conductive film of Examples and Comparative Examples were evaluated. Each evaluation method is as follows.

[Flexibility]

Tensile test was carried out in accordance with JIS K6251 (2010), and the elongation at break (Eb) was calculated. A test piece has the shape of dumbbell No. 2, and the elongation rate was 100 mm/min.

[Conduction Characteristics]

The volume resistivity of the conductive film was determined in accordance with parallel terminal electrode method in JIS K6271 (2008). The volume resistivity was determined without an insulating resin support for supporting the conductive film (test piece) but by using the conductive film alone. The volume resistivity was measured at four different elongation ratios. In other words, the first measurement was carried out in natural conditions (unextended); the second measurement was carried out at an elongation ratio of 60%; the third measurement was carried out at an elongation ratio of 100%; and the fourth measurement was carried out at an elongation ratio of 200%. Here, the elongation ratio is a value calculated in accordance with Equation (I):

$$\text{Elongation ratio (\%)} = (\Delta L_0/L_0) \times 100 \qquad \text{(I)}$$

[$L_0$: the gauge length of a test piece; and $\Delta L_0$: an increase in the gauge length of the test piece by elongation]

Table 1 shows the evaluation results of each conductive film of Examples and Comparative Examples.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Silver nanowire/copolymer A (without crosslinkage) | | 100 | — | — | — | — | — | — | — |
| Silver nanowire/copolymer B (with crosslinkage) | | — | 100 | — | — | — | — | — | — |
| Silver nanowire/copolymer A + acrylic rubber (with crosslinkage) | | — | — | 100 | — | — | — | — | — |
| Silver nanowire/copolymer A + polyurethane resin A (without crosslinkage) | | — | — | — | 100 | — | — | — | — |
| Silver nanowire/copolymer C + copolymer D (without crosslinkage) | | — | — | — | — | 100 | — | — | — |
| Polymer | Polyurethane resin A | — | — | — | — | — | 100 | — | — |
| | Polyurethane resin B | — | — | — | — | — | — | — | 100 |
| | Acrylic rubber | — | — | — | — | — | — | 100 | — |
| Conductive material | Silver powder A | — | — | — | — | — | — | — | 1340 |
| | Silver powder B | — | — | — | — | — | 300 | 300 | — |
| Crosslinking agent | Ethylenediamine | — | — | 0.1 | — | — | — | 0.1 | — |
| | Diphenylmethane diisocyanate | — | 0.05 | — | — | — | — | — | — |
| Silver content (calculated from values measured by TGA) | | 66 | 62 | 65 | 67 | 70 | 298 | 297 | 1338 |
| Characteristics | Initial (unextended) volume resistivity [$\Omega \cdot cm$] | $4 \times 10^{-4}$ | $5 \times 10^{-4}$ | $4 \times 10^{-4}$ | $3 \times 10^{-4}$ | $6 \times 10^{-4}$ | $1 \times 10^{-4}$ | $5 \times 10^{-4}$ | $3 \times 10^{-4}$ |
| | Volume resistivity at 60% elongation [$\Omega \cdot cm$] | $7 \times 10^{-4}$ | $8 \times 10^{-4}$ | $8 \times 10^{-4}$ | $7 \times 10^{-4}$ | $9 \times 10^{-4}$ | $3 \times 10^{-3}$ | $3 \times 10^{-3}$ | Broken |
| | Volume resistivity at 100% elongation [$\Omega \cdot cm$] | $1 \times 10^{-3}$ | $2 \times 10^{-3}$ | $1 \times 10^{-3}$ | $1 \times 10^{-3}$ | $3 \times 10^{-3}$ | $1 \times 10^{-2}$ | $7 \times 10^{-3}$ | Broken |
| | Volume resistivity at 200% elongation [$\Omega \cdot cm$] | $8 \times 10^{-3}$ | $9 \times 10^{-3}$ | $9 \times 10^{-3}$ | $1 \times 10^{-2}$ | $8 \times 10^{-3}$ | Broken | $1 \times 10^{-1}$ | Broken |
| | Elongation at break [%] | 347 | 292 | 402 | 253 | 321 | 102 | 398 | 30 |

As shown in Table 1, the conductive films of Examples 1 to 5 had a large elongation at break. This result reveals that the conductive films of Examples 1 to 5 each have excellent flexibility and extensibility. Further, there is little difference in volume resistivity among the conductive films of Examples 1 to 5 and the conductive films of Comparative Examples 1 to 3 in the unextended condition when compared. Whereas, the silver contents of the conductive films of Comparative Examples 1 to 3 are much larger than those of the conductive films of Examples 1 to 5. Thus, the conductive films of Examples 1 to 5 had a small silver content but exhibited a high electric conductivity. By comparison of changes in the volume resistivities at the time of elongation, the conductive films of Examples 1 to 5 had a smaller increase in the electrical resistance even when elongated. Specifically, the conductive films elongated at an elongation ratio of 200% had a small increase in the electrical resistance of about 10 to 30 times. In contrast, the conductive films of Comparative Examples 1 and 2 had a large increase in the electrical resistance when elongated. The conductive film of Comparative Example 1 was broken at an elongation ratio of 200%, and the conductive film of Comparative Example 3 was broken at an elongation ratio of 60%.

The above results reveal that the conductive material of the present invention is flexible and excellent in extensibility and has high electric conductivity and an electrical resistance that is less likely to increase even when the conductive material is extended.

(2) The durability of the conductive film of Example 1 and the conductive film of Comparative Example 3 was evaluated. Two durability test methods will next be described.

[First Durability Test]

FIG. 3 shows an outline of the first durability test. As shown in FIG. 3, a device 50 includes a substrate 500 and a pair of electrodes 501, 502. The substrate 500 is made of H-NBR and has a circular, thin film-like shape. The electrode 501 is disposed on the top face of the substrate 500. The electrode 502 is disposed on the bottom face of the substrate 500. Each of the electrodes 501, 502 has a circular, thin film-like shape that is smaller than the substrate 500 and is arranged so as to be substantially concentric with the substrate 500. Each of the pair of electrodes 501, 502 has a rectangular plate-like terminal that protrudes radially outward. The terminal of the electrode 501 extends to the right. The terminal of the electrode 502 extends to the left.

First, the terminal of the electrode 501 was connected to the left end of a lead wire 51 with an electrically conductive adhesive 52 (shown by the hatching in FIG. 3). Next, the left end of the device 50 was held by a holder 53a, and the right end of the lead wire 51 was held by a holder 53b. The holder 53b was moved as shown by the white arrow in the drawing to extend and contract the device 50 in the left-right direction. An extension-contraction cycle was carried out in such a manner that the device 50 had an elongation ratio in the left-right direction of 20%, and was repeated 5,500 times. The electrical resistance between the right and left ends of the lead wire 51 was determined before the extension-contraction cycles (in the initial state) and after the extension-contraction cycles. The test was carried out using two different materials for the pair of electrodes 501, 502. The conductive film of Example 1 was used in the first round, and the conductive film of Comparative Example 3 was used in the second round.

[Second Durability Test]

FIG. 4 shows an outline of the second durability test. As shown in FIG. 4, on the top face of a substrate 54, electrodes 01X to 08X and wirings 01x to 08x are formed. The wirings 01x to 08x are connected to the corresponding electrodes 01X to 08X. The substrate 54 is made of a urethane elastomer. The electrodes 01X to 08X have a strip shape and are made of a conductive material in which carbon black is dispersed in acrylic rubber. First, the left end of the substrate 54 was held by a holder 55a and the right end of the substrate 54 was held by a holder 55b such that the wirings 01x to 08x extending in the left-right direction were interposed between the holders 55a and 55b. The holder 55b was moved as shown by the white arrow in the drawing to extend and contract the substrate 54 in the left-right direction. An extension-contraction cycle was carried out in such a manner that the substrate 54 had an elongation ratio in the left-right direction of 20%, and was repeated 5,500 times. The electrical resistance between the right and left ends of the wiring 01x was determined before the extension-contraction cycles (in the initial state) and after the extension-contraction cycles. The test was carried out using two different materials for the wirings 01x to 08x. The conductive film of Example 1 was used in the first round, and the conductive film of Comparative Example 3 was used in the second round.

[Evaluation Result]

Table 2 shows the results of two durability tests. In Table 2, ○ indicates that the electrical resistance after the repeated extension and contraction is not more than 100 times the initial electrical resistance, and x indicates that the electrical resistance after the repeated extension and contraction is more than 100 times the initial electrical resistance.

TABLE 2

|  | Example 1 | Comparative Example 3 |
|---|---|---|
| First durability test | ○ | x |
| Second durability test | ○ | x |

As shown in Table 2, the conductive material of Comparative Example 3 had an increase in the electrical resistance of more than 100 times, but the conductive material of Example 1 had an increase in the electrical resistance of 100 times or less, in each test. The above results reveal that the conductive material of the present invention has an electrical resistance less likely to increase even when the extension and contraction is repeated, and has excellent durability.

INDUSTRIAL APPLICABILITY

The conductive material of the present invention is suitably used as electrodes and wirings for flexible transducers. The conductive material is also suitable as wirings of flexible wiring boards used for, for example, the control of moving parts of robots and industrial machines, wearable devices, flexible displays, and other devices. The conductive material is also suitably used for electromagnetic wave shields and electrically conductive adhesives.

The invention claimed is:

1. A conductive material characterized by comprising:
   metal nanowires; and
   an extensible copolymer having an N—C=O structure and combined with the metal nanowires.

2. The conductive material according to claim 1, wherein the copolymer is a copolymer of a plurality of monomers including a growth direction control monomer that has an N—C=O structure and controls a growth direction of the metal nanowires.

3. The conductive material according to claim 2, wherein a monomer that is copolymerized with the growth direction control monomer is a raw material monomer of an elastomer.

4. The conductive material according to claim 2, wherein the growth direction control monomer is N-vinyl-2-pyrrolidone.

5. The conductive material according to claim 1, wherein the copolymer has a glass transition temperature (Tg) of 25° C. or less.

6. The conductive material according to claim 1, wherein the copolymer has a crosslinked structure.

7. The conductive material according to claim 1, wherein the metal nanowires contain silver.

8. A method for producing a conductive material, the method characterized by comprising:
   a copolymer production step of polymerizing a plurality of monomers including a growth direction control monomer that has an N—C=O structure and that controls a growth direction of metal nanowires to produce an extensible copolymer;
   a reaction step of reacting a metal compound in a solvent containing the copolymer to grow metal nanowires in a longitudinal direction; and
   an extraction step of extracting a product from a solution after the reaction.

9. The method for producing a conductive material according to claim 8, further comprising:
   a crosslinking step of adding a crosslinking agent to the product and crosslinking the copolymer in the product, after the extraction step.

10. The method for producing a conductive material according to claim 9, wherein
   in the crosslinking step, an elastomer polymer crosslinkable with the copolymer is added.

11. A transducer characterized by comprising:
   a dielectric layer made of an elastomer;
   a plurality of electrodes with the dielectric layer interposed therebetween; and
   wirings connected to the corresponding electrodes, wherein
   either one or both of the electrodes and the wirings include the conductive material as claimed in claim 1.

* * * * *